006# UNITED STATES PATENT OFFICE.

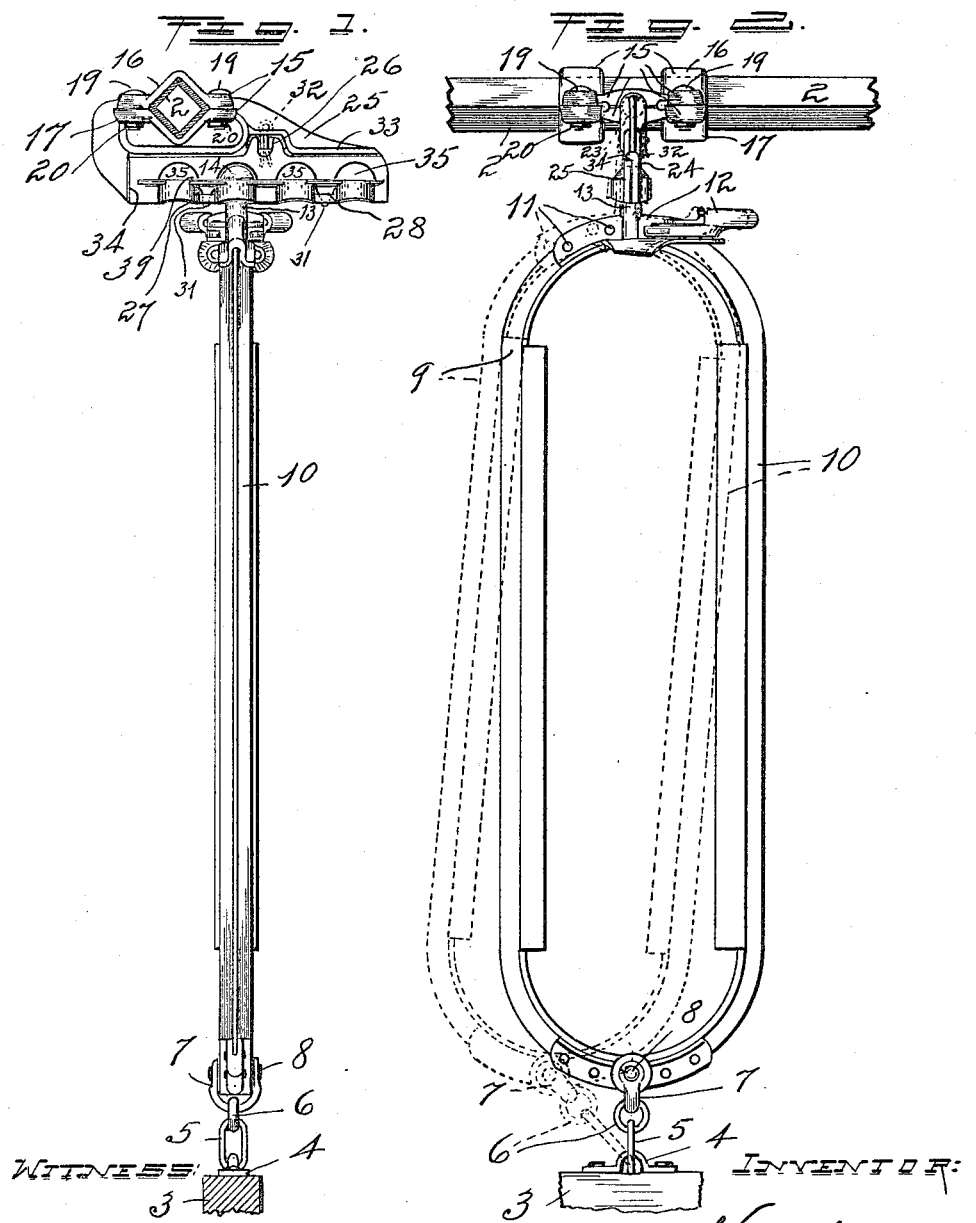

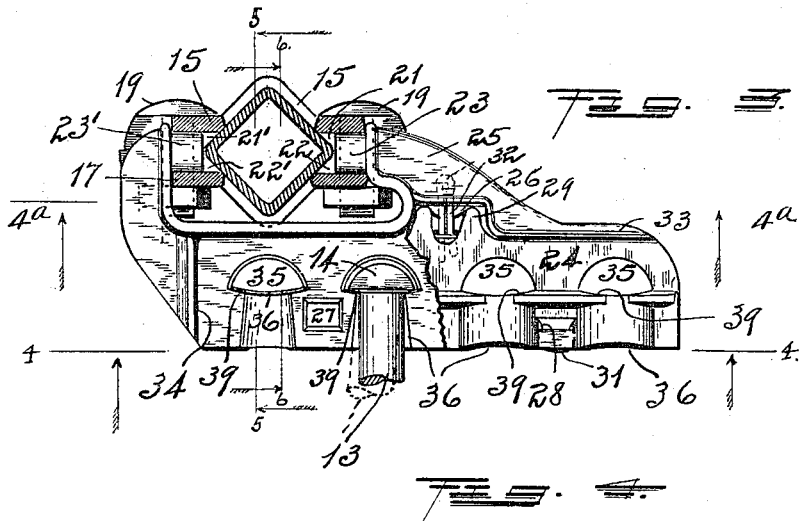
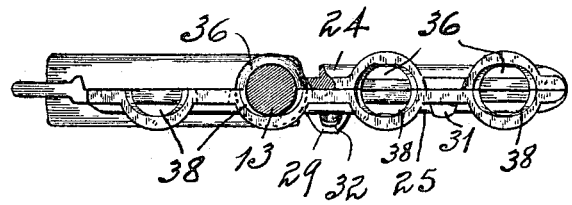
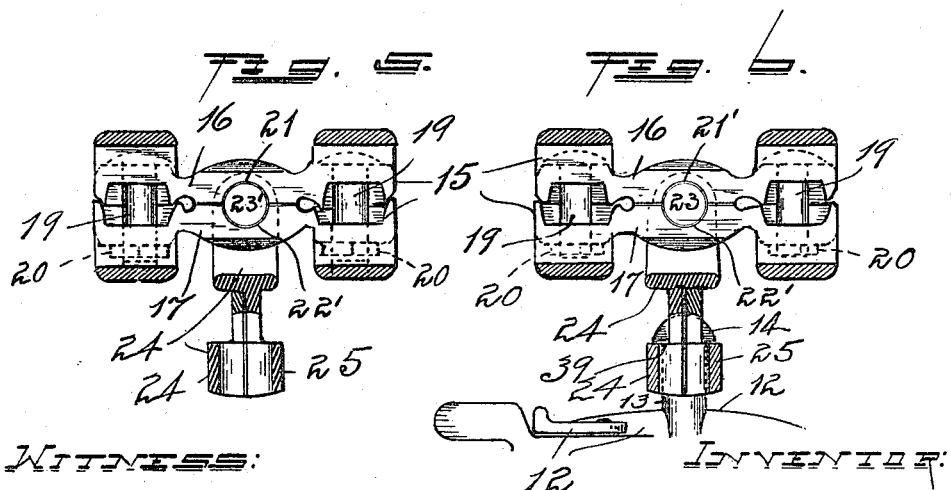

ALFRED W. KNUTSON, OF GALESBURG, ILLINOIS, ASSIGNOR TO ROWE MANUFACTURING CO., OF GALESBURG, ILLINOIS, A CORPORATION OF ILLINOIS.

CATTLE-ALINING DEVICE.

1,214,176.

Specification of Letters Patent.    Patented Jan. 30, 1917.

Application filed July 11, 1916.   Serial No. 108,559.

*To all whom it may concern:*

Be it known that I, ALFRED W. KNUTSON, a citizen of the United States, and a resident of Galesburg, in the county of Knox and State of Illinois, have invented a new and useful Cattle-Alining Device, of which the following is a specification.

My invention relates to that class of devices which are securable to the transverse stall-members and which are adapted to hold the stanchions at different points of adjustment relatively to the length of the stall, whereby a plurality of animals in a series of stalls may be brought into and held in such positions that their rear portions will be in line, whereby practically their droppings will fall into the gutter which is provided at the rear end of each row of stalls.

The principal object of the invention is to generally improve the construction and increase the utility and efficiency of devices of this character. To this end one of the improvements is directed more particularly toward the provision of means whereby the stanchion-adjusting arm or arms may be flexibly connected to the stall members, the principal objects of the flexible connection being to avoid the danger, incident to rigidly connected arms, of breakage thereof, and to dispense with the use of divergent links and other ineffective means of similar nature.

Another object—and withal an important one, is to bring the stanchion close to the supporting arm. This I accomplish by providing an adjusting arm (or arms) which requires no chain or the like to support it.

It is an object to provide a stanchion-adjusting arm which is not only itself flexibly mounted, but in which the stanchion-head is, without the use of chains or links, also flexibly mounted.

Numerous other objects will presently appear, some of these being obvious and others particularly pointed out.

In the accompanying drawings, which show a preferred embodiment of my invention: Figure 1 is an edge view of a stanchion supported or held between the supporting-rail and the curb of a common form of cattle stall, these being shown in section and my improvements shown in side elevation; Fig. 2 is a front elevation; however, inasmuch as the clip (presently described) and the parts sustained thereby are reversible, this might also be a rear elevation; Fig. 3 is an enlarged detail, partly broken away, and presently more fully described; Fig. 4, a bottom plan, partly in section in the line 4—4 in Fig. 3 and the parts beyond the line 4ª—4ª in said figure not shown; Fig. 5, a transverse section, taken in the line 5—5 in Fig. 3; and Fig. 6, a transverse section taken in the line 6—6 in Fig. 3.

Considering the drawings in detail, 2 indicates the upper and 3 the lower transverse bar of a cattle stall. 4 indicates a clip, 5 a link, 6 a ring, and 7 a clevis pivoted by a pin 8 to stanchion bars 9 and 10. To none of these parts *per se* do I make claim.

To the bar 9 is fixed by rivets 11 a locking head 12 whereby the upper end of the bar 10 may be locked in engagement with the adjacent end of the bar 9. The head 12 has at its top a projection 13 having a mushroom boss 14 at its terminal. In all other respects the head may be of any suitable construction, the preferred one being shown in my copending application Serial No. 108,211 filed July 8 1916.

15 indicates a clip comprising an upper member 16 and a lower member 17. They are provided at their corners with registering apertures for the reception of bolts 19 adapted for engagement by nuts 20 whereby to lock the clip on the support 2.

21, 21' designate semicircular bearings in the member 16 and in alinement with each other, and 22, 22' indicate bearings in the member 17 and together with the bearings 21, 21' forming bearings for the rocker-studs 23, 23' of one member or part 24 of a stanchion-adjusting arm, the other member of which is designated by 25. The arm 24 is provided with transversely arranged apertures 26, 27 and 28, and through these project respectively an ear 29 and hooks 30, 31. 32 indicates a cotter projected through an opening in the ear 29, the hooks and cotter locking the arm-members 24 and 25 together. In order to hold them still more rigidly I provide the member 24 with a lip 33 overlying the upper edge of the member 25, and near its rear end said member 25 is provided with an elongated shoulder 34 (Fig. 3) against which the rear end of the member 24 abuts. The member 24 is provided with a series of arch-like transversely arranged openings 35 in its web or upper portion and with a series of vertically arranged substantially semicircular openings 36 in its lower portion. The openings 35 communicate with like ones in the web of the member 25, and the openings 36 with opposed substantially semicircular ones, 38, in said member 25. As will be noted, however, especially by reference to Figs. 3 and 4, the openings provided by the opposed apertures 36 and 38 are flared, in order that the projection 13 may have slight play therein; and it will be seen also that the registering apertures 35 are sufficiently large to allow the mushroom or button 14 to move slightly on its seat 39 provided by the upper edges of the walls about each of said apertures.

To assemble the device the rocker-studs 23, 23′ are seated in the bearings 22, 22′, the clip member 16 having been positioned on the support 2. The clip member 15 is then positioned and the bolts 18 and nuts 19 engaged whereby to securely fasten the clip on the support 2. The adjusting-arm member 24 is then positioned, but before its members 24, 25 are united the projection 13 is seated to swivel in the desired ones of the openings 36, 38. For the purposes of this specification the annular opening formed by each of the pairs 36—38 may be termed a pocket. It will be evident that the button 14 seats loosely on the seat 39 and that it is free to turn or rock in the openings 35. The hooks 30 and 31 are then passed through the apertures 27 and 28, and the ear 29 projected through the opening 26, whereupon the cotter 32 is pushed through the opening in said ear whereby to draw and lock the members 24—25 tightly together. The adjusting-arm is thus free to rock laterally on its studs 23, 23′, to allow the head 12 and thereby the stanchion to swing likewise, as shown clearly at Fig. 2. Therefore, the cow may swing her head from side to side to card herself, to reach feed at the sides of the stall, etc., but nevertheless the swivel 13 will hold the head 12 and thus the top of the stanchion from more than a minimum movement (permitted by the enlarged lower end of the opening 35) whereby her position relative to the gutter may be fixed and predetermined. Should she be a very long cow the clip 15 and thereby the adjusting arm may be turned to a position in front of the stall. The stanchion may swivel on the projection 13 in an evident manner.

Many of the details and combinations illustrated and hereinbefore described are not necessary to the invention, broadly considered. All this will be indicated in the claims hereof, wherein the omission of an element, or the non-inclusion of reference to the detail features of the elements recited is intended to be a formal declaration of the fact that the omitted elements or features are not essential to the invention covered by that claim.

Having thus set forth the nature of the invention I claim as new the following, to-wit:

1. In a device of the nature described, a support, a stanchion-adjusting arm connected therewith to rock longitudinally with reference thereto, and a stanchion connected with said arm.

2. In a device of the nature described, a support, a stanchion-adjusting arm flexibly connected therewith to rock longitudinally with reference thereto, and a stanchion connected with said arm.

3. In a device of the nature described, a support, a stanchion-adjusting arm rockingly connected therewith, and a stanchion having swivel connection with said arm.

4. In a device of the nature described, a support, a stanchion-adjusting arm connected therewith to rock in the longitudinal axis thereof, and a stanchion connected with said arm.

5. In a device of the nature described, a support, a rocking, stanchion-adjusting arm pivotally connected therewith, and a stanchion connected with said arm.

6. In a device of the nature described, a support, a clip secured thereto, a stanchion-adjusting arm pivoted to said clip to rock when in operation, and a stanchion connected with said arm.

7. In a device of the nature described, a support, a stanchion-adjusting rocker-arm pivotally connected therewith and comprising interengaged members, and a stanchion connected with said interengaged members.

8. In a device of the nature described, a support, an arm comprising separable, united members connected therewith and having a series of pockets, the side-portions of each pocket formed partly in one and partly in the other of said members, and a stanchion-head having a mushroom-headed projection adapted for engagement with any one of said pockets.

9. In a device of the nature described, a support, a clip securable thereto, an adjusting rocker-arm mounted in said clip, and a stanchion connected with said arm.

10. In a device of the nature described, supporting means, a stanchion-adjusting arm connected thereto to have free lateral swinging movement, and a stanchion connected with said arm and having rocking movements relatively thereto.

11. In a device of the nature described, a support, a clip thereon, an arm connected to said clip and adapted to swing laterally, a stanchion head connected with said arm and having rocking and pivotal movements relatively to said head, and stanchion arms connected with said head.

12. A stanchion-adjusting arm comprising separable, united members having a plurality of pairs of apertures and a plurality of annular pockets arranged at right angles thereto, substantially one-half of each aperture and each pocket being formed in the confronting faces of said members.

13. In combination, a stanchion-adjusting arm comprising members having a plurality of pairs of apertures and a plurality of annular pockets communicating therewith and arranged at right angles thereto, and a stanchion head having a projection swiveled in one of said pockets, said projection having a mushroom head arranged in that pair of apertures which communicates with the pocket in which the projection has placement.

14. A stanchion-adjusting arm comprising coacting members one of which has a plurality of openings and the other of which has a hook adapted to engage one of said openings and an apertured ear adapted to pass through another thereof, and a cotter engaging the aperture in said ear, said coacting members provided with coacting portions adapted to be engaged by a stanchion-head.

15. In stall equipment, and in combination, a stanchion-supporting rail running transversely across the stall, a stanchion-adjusting arm pivotally connected therewith to rock laterally of itself and longitudinally of said rail, and a stanchion connected with said arm.

16. In stall equipment, and in combination, a stanchion-supporting rail running transversely across the stall, a stanchion-adjusting arm pivotally connected therewith to rock laterally of itself and longitudinally of said rail, but not otherwise, and a stanchion connected with said arm.

17. In a device of the nature described, a support, a rocker-arm connected therewith, adapted to sustain an element at various points along its length, and a stanchion connected to said element.

18. In combination, a transversely arranged stall-rail, an adjusting-arm, means for connecting it with said rail in such manner that it will rock in the direction of the axis thereof, a stanchion-head adapted for selective engagements with said arm, a stanchion-arm to which said head is attached, and a stanchion arm adapted to engage said head.

19. In combination, a stanchion arm, a stanchion arm pivoted thereto, a head fixed to said first recited arm and adapted for engagement by the other, said head having an upward projection, a rocker with which said projection is adapted for various engagements, and a support for the rocker.

In testimony whereof I hereunto affix my signature, at Galesburg, Illinois, this 8th day of July, 1916.

ALFRED W. KNUTSON.

Copies of this patent may be obtained for five cents each, by addressing the "Commissioner of Patents, Washington, D. C."